(12) United States Patent
Kim (10) Patent No.: US 7,813,721 B2
(45) Date of Patent: Oct. 12, 2010

(54) MOBILE TERMINAL, SYSTEM AND METHOD FOR CONTROLLING ACCESS TO AN ENHANCED SERVICES SYSTEM

(75) Inventor: Jeong-Ho Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 433 days.

(21) Appl. No.: 11/533,028

(22) Filed: Sep. 19, 2006

(65) Prior Publication Data

US 2007/0123231 A1 May 31, 2007

(30) Foreign Application Priority Data

Sep. 23, 2005 (KR) ...................... 10-2005-0088976

(51) Int. Cl.
*H04Q 3/70* (2006.01)
(52) U.S. Cl. ................. 455/414.1; 455/411; 455/422.1; 455/432.1; 455/435.1; 455/435.2
(58) Field of Classification Search ............. 455/414.1, 455/432.1, 411, 433, 422.1, 435.1, 435.2; 709/225, 227
See application file for complete search history.

(56) References Cited

U.S. PATENT DOCUMENTS

| | | | | |
|---|---|---|---|---|
| 6,397,056 | B1 * | 5/2002 | Bugnon et al. ............. | 455/411 |
| 6,529,727 | B1 * | 3/2003 | Findikli et al. ............. | 455/411 |
| 6,628,954 | B1 * | 9/2003 | McGowan et al. .......... | 455/461 |
| 2002/0193112 | A1 | 12/2002 | Aoki et al. | |
| 2003/0017822 | A1 * | 1/2003 | Kissner et al. .............. | 455/411 |
| 2004/0243661 | A1 * | 12/2004 | Ahn et al. ................... | 709/200 |
| 2005/0227688 | A1 * | 10/2005 | Li et al. .................... | 455/432.1 |
| 2005/0282544 | A1 * | 12/2005 | Oommen et al. ......... | 455/432.1 |

FOREIGN PATENT DOCUMENTS

| | | |
|---|---|---|
| CN | 1599315 A | 3/2005 |
| CN | 1599495 A | 3/2005 |

* cited by examiner

*Primary Examiner*—Charles N Appiah
*Assistant Examiner*—William F Rideout
(74) *Attorney, Agent, or Firm*—Birch, Stewart, Kolasch & Birch, LLP

(57) ABSTRACT

A mobile terminal having restricted access to an enhanced services system includes a transceiver which transmits and receives wireless signals, a memory which stores a first preferred roaming list (PRL) listing a basic communication system and an enhanced services system, and a second PRL listing the basic communication system but not the enhanced services system, and a controller which restricts access of the mobile terminal to the enhanced services system by deactivating the first PRL and activating the second PRL in response to receipt of an authentication failure report from the enhanced services system. A system for restricting access to an enhanced services system includes an enhanced services system which provides enhanced services to authorized users and prevents unauthorized users from communicating with the enhanced services system.

16 Claims, 5 Drawing Sheets

MOBILE TERMINAL, SYSTEM AND METHOD FOR CONTROLLING ACCESS TO AN ENHANCED SERVICES SYSTEM

This application claims the benefit of Korean Patent Application No. 10-2005-0088976, filed on Sep. 23, 2005, which is hereby incorporated by reference in its entirety.

BACKGROUND OF THE INVENTION

1. Field of the Invention

The present invention relates to a mobile communication system, and more particularly, to a mobile terminal, system and method for restricting access to an enhanced services system.

2. Description of the Related Art

Evolution-Data Optimized (EVDO), also referred to as Evolution-Data Only, is a wireless radio broadband data standard for high data rate communication. As demand for high data rate services, such as Video On Demand (VOD) and Music On Demand (MOD), is increasing, EVDO systems are increasingly being deployed with pre-existing voice networks, such as 1× networks. Although 1× networks are capable of providing data communication, they are optimized for voice communication and cannot provide the high data rates which EVDO systems provide.

In an EVDO system, the overall throughput of the system depends on the number of users communicating with the system. Thus, the data rate available to any one user depends on the number of other users using the system. Further, when a large number of users simultaneously transmit data to a base station of an EVDO system, there is a large amount of uplink interference, which lowers the available data rate for all users.

Since interference is generated each time a user communicates with an EVDO system, there is a need to prevent non-authorized users from communicating with an EVDO system. Non-authorized users may include, for example, users who are not subscribers to the EVDO system, subscribers who have not paid their bills, and subscribers whose subscription period has expired.

Figure 1:
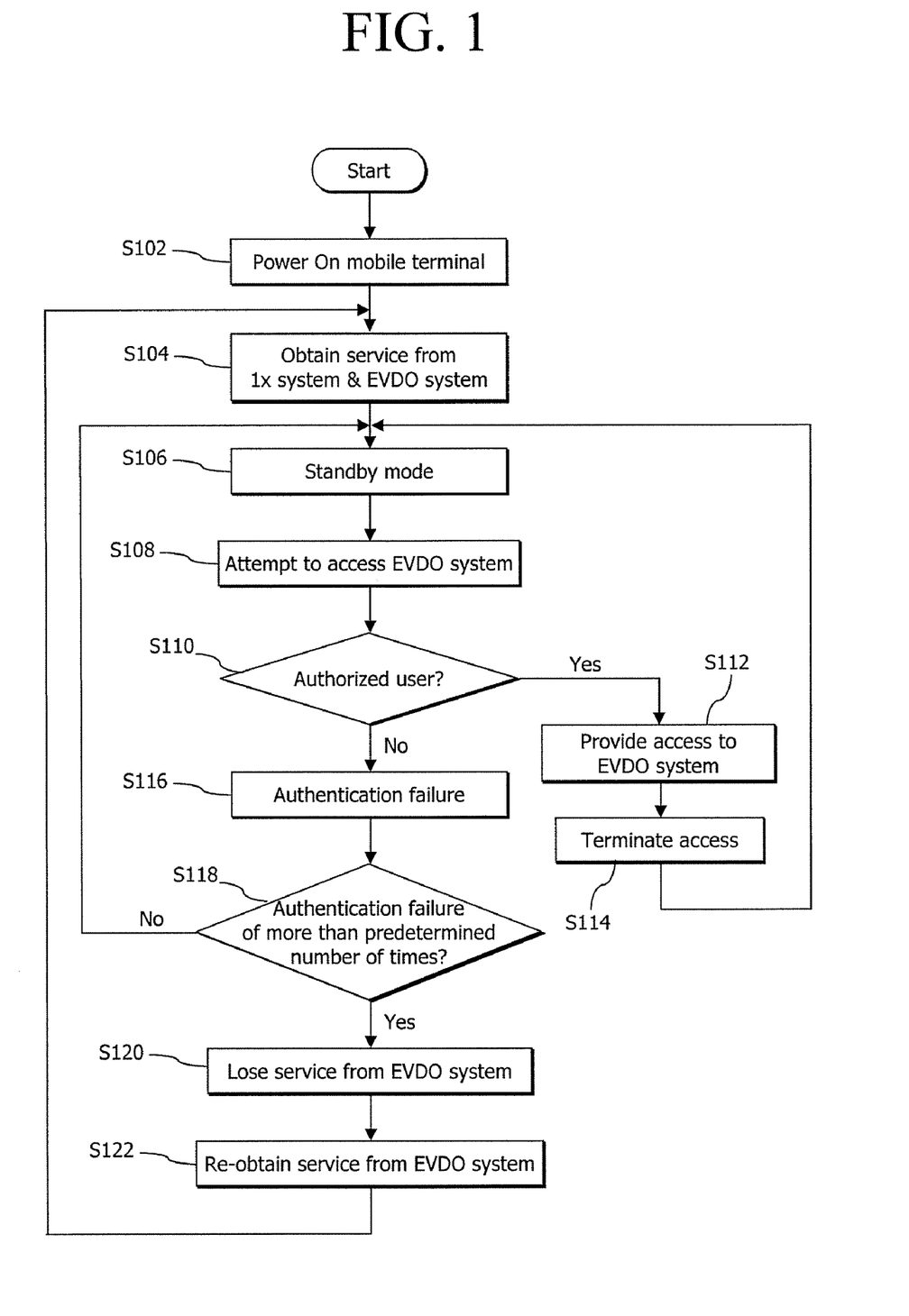
FIG. 1 is a flow chart showing a conventional method performed by a mobile terminal when it attempts to access an EVDO system.

FIG. 1 is a flow chart showing a conventional method performed by a mobile terminal when it attempts to access an EVDO system.

As illustrated in FIG. 1, a mobile terminal is first powered on (S102). If the mobile terminal is located in a service area of a 1× system and an EVDO system, an initialization process is performed by the mobile terminal to obtain service from the 1× system and the EVDO system (S104). The mobile terminal then enters into a standby mode (S106). When a mobile terminal user attempts to use the EVDO system (S108), the EVDO system determines whether the user is an authorized user of the EVDO system (S110), for example, by comparing a subscriber identifier associated with the mobile terminal with a list of authorized subscriber identifiers. If the user is authorized, the user is provided access to the EVDO system (S112). After the user finishes using the EVDO system (S114), the mobile terminal returns to the standby mode (S106).

However, if the EVDO system determines that the mobile terminal user is not an authorized user of the EVDO system (S110), the system reports an authentication failure to the mobile terminal (S116), which keeps track of the number of times an authentication failure has occurred. The mobile terminal then determines whether an authentication failure has occurred more than a predetermined number of times (typically, three) (S118). If the mobile terminal determines that an authentication failure has occurred more than the predetermined number or times, the mobile terminal then loses its service from the EVDO system (S120). However, after the passage of a predetermined amount of time (typically, between three and ten minutes), the mobile terminal once again performs an initialization process to re-obtain service from the EVDO system (S122).

According to the process described above, when an unauthorized user attempts to use the EVDO system, the EVDO system must perform processes to determine whether the user is authorized. Even when the EVDO system determines that a user is unauthorized, the EVDO system must later perform these processes again if the user later attempts to use the EVDO system again. The signaling exchanged between the mobile terminal and a base station of the EVDO system every time the user attempts to use the EVDO system increases the load on the EVDO system, wastes wireless resources, and causes unnecessary interference to other users.

Moreover, even when a user who is not an EVDO subscriber uses the 1× system instead of the EVDO system to perform data communication, the user's mobile terminal continues to monitor the EVDO system when it is in service, which unnecessarily consumes power from the mobile terminal's battery.

SUMMARY OF THE INVENTION

One of the features of the present invention is that it solves the above-noted problems by restricting access to an enhanced services system.

To achieve at least this feature, there is provided a mobile terminal having restricted access to an enhanced services system which includes a transceiver which transmits and receives wireless signals, a memory which stores a first preferred PRL listing a basic communication system and an enhanced services system, and a second PRL listing the basic communication system but not the enhanced services system, and a controller which restricts access of the mobile terminal to the enhanced services system by deactivating the first PRL and activating the second PRL in response to receipt of an authentication failure report from the enhanced services system.

The basic communication system may be a 1× system. The enhanced services system may be an EVDO system. The enhanced services system may send the authentication failure report to the mobile terminal if a user of the mobile terminal is not an authorized user of the enhanced services system. The user of the mobile terminal may be not an authorized user of the enhanced services system if the user is not a subscriber to the enhanced services system, the user is a subscriber who has not paid his bills, or the user is a subscriber whose subscription period has expired.

The controller may enable access to the enhanced services system by activating the first PRL. The mobile terminal may also include at least one of a display and a speaker which outputs a message notifying a user to contact his service provider when the second PRL is activated.

There is also provided a system for restricting access to an enhanced services system which includes an enhanced services system which provides enhanced services to authorized users and prevents unauthorized users from communicating with the enhanced services system.

The enhanced services system may determine whether a mobile terminal user is an authorized user of the enhanced services system based on a subscriber identifier of a mobile terminal of the user. The enhanced services system may prevent an unauthorized user from communicating with the enhanced services system by deleting a first PRL stored in a mobile terminal of the unauthorized user which lists a basic communication system and the enhanced services system, and downloading to the mobile terminal a second PRL which lists the basic communication system but not the enhanced services system. The enhanced services system may allow the unauthorized user to communicate with the enhanced services system when the unauthorized user becomes an authorized user by deleting the second PRL and downloading the first PRL to the mobile terminal. The basic communication system may be a 1× system, and the enhanced services system may be an EVDO system.

There is also provided a method for restricting access to an enhanced services system which includes obtaining service from an enhanced services system, attempting to use the enhanced services system with a mobile terminal, determining whether a user of the mobile terminal is an authorized user of the enhanced services system, and downloading a first PRL listing a basic communication service but not the enhanced services system to the mobile terminal if it is determined that the user of the mobile terminal is not an authorized user of the enhanced services system.

The determination of whether the user of the mobile terminal is an authorized user of the enhanced services system may be performed based on a subscriber identifier of the mobile terminal. The method may also include deleting a second PRL stored in the mobile terminal which lists the basic communication system and the enhanced services system. The method may also include deleting the first PRL and downloading a second PRL to the mobile terminal which lists the basic communication system and the enhanced services system when the user of the mobile terminal becomes an authorized user of the enhanced services system, obtaining service from the enhanced services system, and accessing the enhanced services system with the mobile terminal. The basic communication system may be a 1× system, and the enhanced services system may be an EVDO system.

There is also provided a method for restricting access to an enhanced services system which includes obtaining service from an enhanced services system, attempting to use the enhanced services system with a mobile terminal, determining whether a user of the mobile terminal is an authorized user of the enhanced services system, notifying the user of the mobile terminal of an authentication failure if the user of the mobile terminal is not an authorized user of the enhanced services system, and preventing the mobile terminal from communicating with the enhanced services system by activating a first PRL stored in the mobile terminal which lists a basic communication system but does not list the enhanced services system.

Preventing the mobile terminal from communicating with the enhanced services system may include deactivating a second PRL stored in the mobile terminal which lists the basic communication system and the enhanced services system. The method may also include allowing the mobile terminal to access the enhanced services system by deactivating the first PRL and activating a second PRL stored in the mobile terminal which lists the basic communication system and the enhanced services system. The basic communication system may be a 1× system, and the enhanced services system may be an EVDO system.

Other exemplary embodiments and features of the present invention may be ascertained by reviewing the present disclosure and the accompanying drawings.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE PREFERRED EMBODIMENTS

Figure 2:
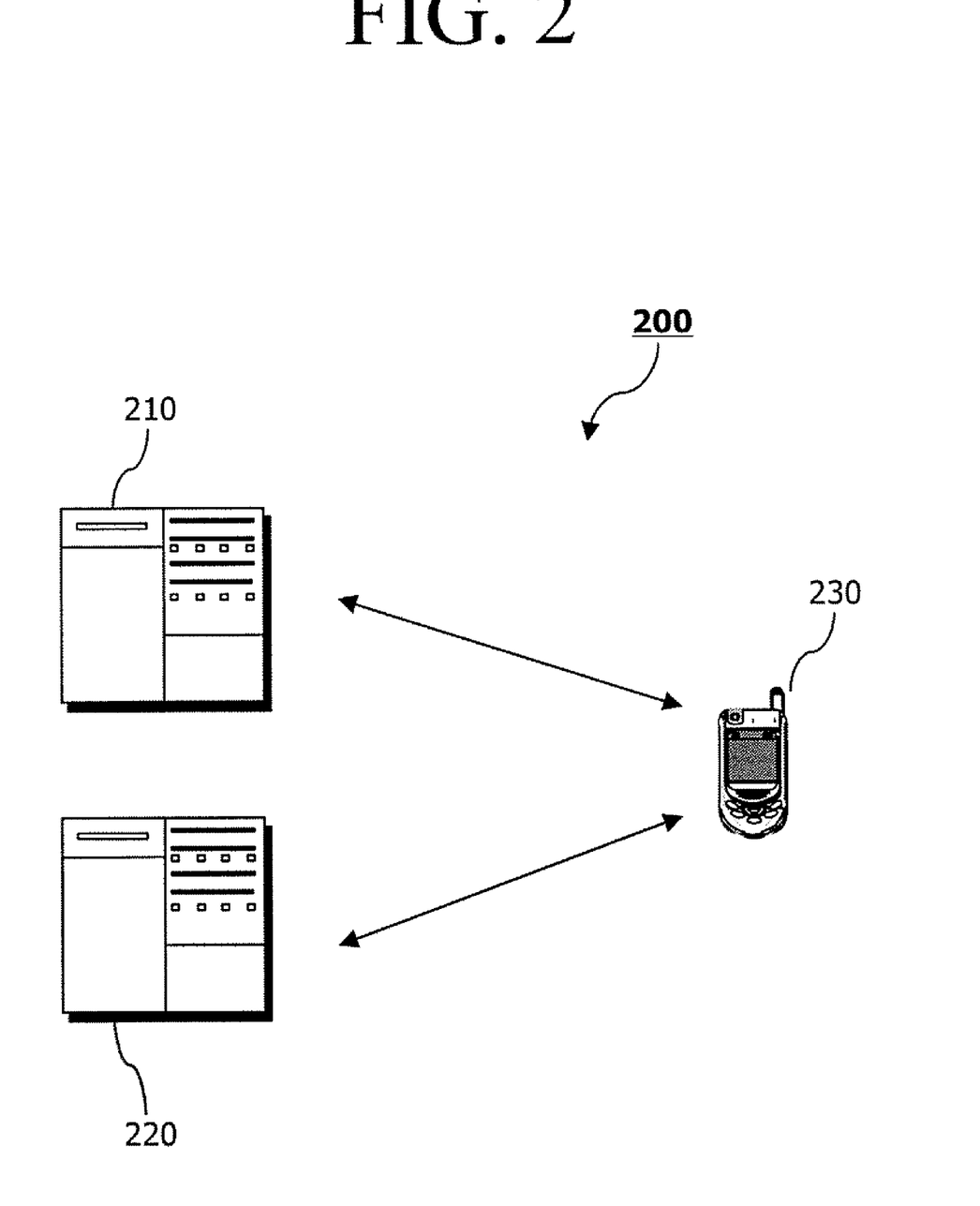
FIG. 2 shows an exemplary embodiment of a system for restricting access to an enhanced services system in accordance with an aspect of the present invention.

Described below is a mobile terminal, system and method for restricting access to an enhanced services system FIG. 2 shows an exemplary embodiment of a system 200 for restricting access to an enhanced services system in accordance with an aspect of the present invention.

The system 200 illustrated in FIG. 2 includes a basic communication system 210, an enhanced services system 220, and a mobile terminal 230 capable of accessing both the basic communication system 210 and the enhanced services system 220. The basic communication system 210 provides basic communication services, such as voice and low-data rate services, and may be, for example, a 1× system. The enhanced services system 220 provides enhanced communication services, such as high-data rate services or other communication services which require a subscription separate from a basic communication services subscription, and may be, for example, an EVDO system. Of course, the present invention is not limited to only a 1× system and an EVDO system, but is equally applicable to other types of communication systems.

A Preferred Roaming List (PRL) is stored in the mobile terminal 230. The PRL is a data file which provides a list of systems the mobile terminal 230 may use, and information necessary for obtaining service from the listed systems. The mobile terminal 230 searches for systems listed in the PRL, and obtains service from the listed systems which it finds. For the mobile terminal 230 to obtain service from the basic communication system 210 and the enhanced service system 220, these systems must be listed in the PRL of the mobile terminal 230.

When a mobile terminal user attempts to use the enhanced services system 220, the enhanced services system 220 determines whether the user is an authorized user of the enhanced services system 220. This may be done, for example, by comparing a subscriber identifier of the mobile terminal 230 with a list of authorized subscriber identifiers. If the mobile terminal user is an authorized user, the enhanced services system 220 provides a requested service to the user (such as, for example, a high data rate connection).

However, if the mobile terminal user is not an authorized user, the enhanced services system 220 prevents the mobile terminal from communicating with the system in the future by changing the PRL of the mobile terminal 230. This may be performed, for example, by downloading a new PRL to the mobile terminal 230 which does not include the enhanced services system 220 in its list. A previous PRL stored in the mobile terminal 230 which included the enhanced service system 220 in its list is then deleted and replaced with the new PRL. Alternatively, the enhanced services system 220 may de-activate a PRL in the mobile terminal 230 which lists the enhanced services system 220, and activate a PRL which does not.

The enhanced services system 220 can download a new PRL to the mobile terminal 230 using an Over The Air Parameter Administration (OTAPA) delivery method, for example. OTAPA is a method of distributing software to mobile terminals, which allows a communication system to update a parameter or PRL of a mobile terminal. With OTAPA, a communication system can establish a channel to a mobile terminal and update the mobile terminal's software without a user's acknowledgement.

Figure 3:
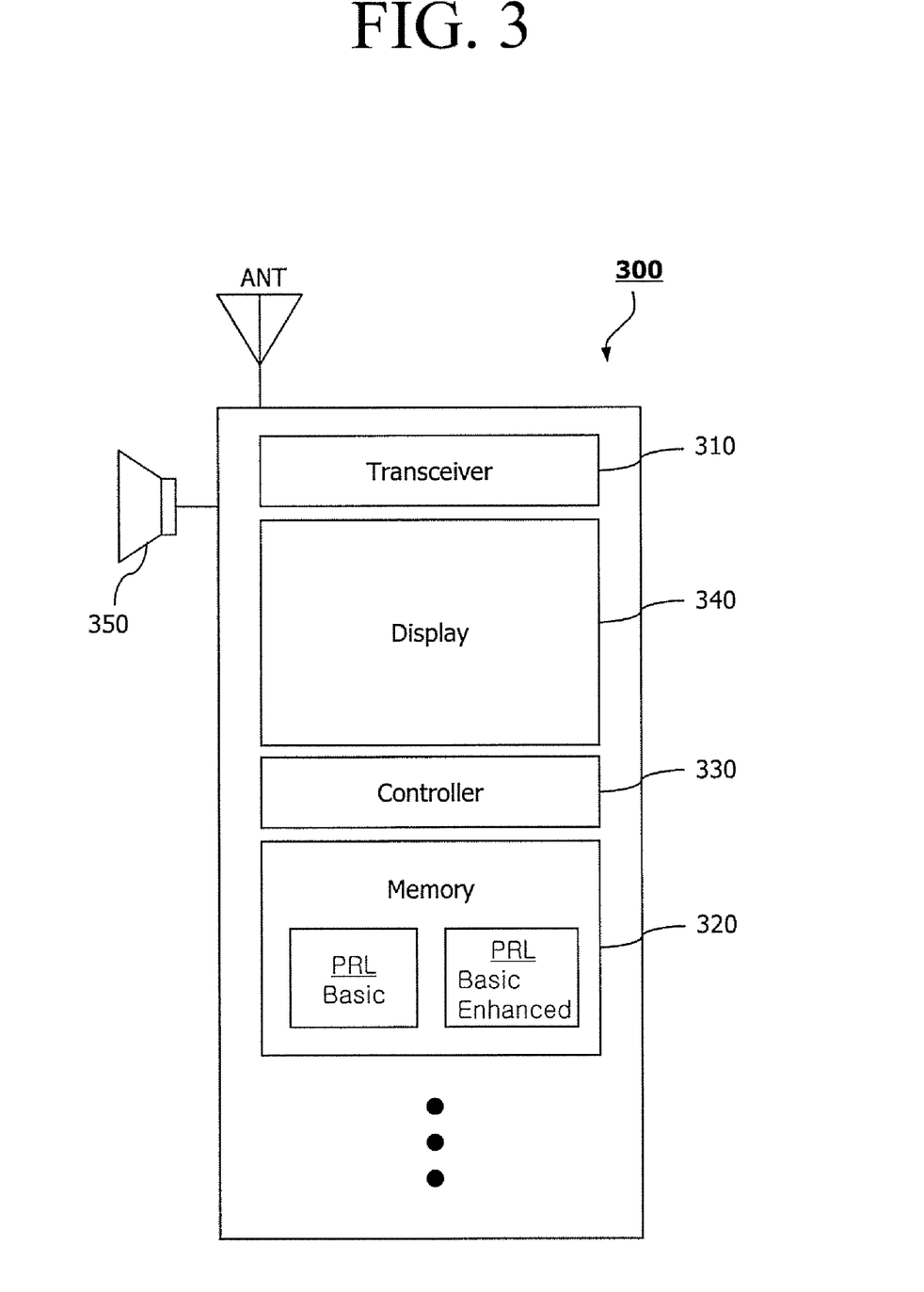
FIG. 3 is a block diagram of an exemplary mobile terminal according to an aspect of the present invention.

FIG. 3 is a block diagram of a exemplary mobile terminal 300 according to an aspect of the present invention.

The mobile terminal 300 shown in FIG. 3 includes a transceiver 310 which transmits and receives wireless signals; a memory 320 which stores at least one PRL; and a controller 330 which performs processes for obtaining service.

In one embodiment, the memory 320 may store two PRLs: one which lists both a basic communication system and an enhanced services system, and one which lists only a basic communication system. In this embodiment, only one PRL is active at a time.

The controller 330 controls which PRL is active, and controls the mobile terminal 300 to search for and obtain service from the systems listed in the active PRL.

The mobile terminal 300 also includes a display 340, such as, for example, a Liquid Crystal Display (LCD), and a speaker 350.

Figure 4:
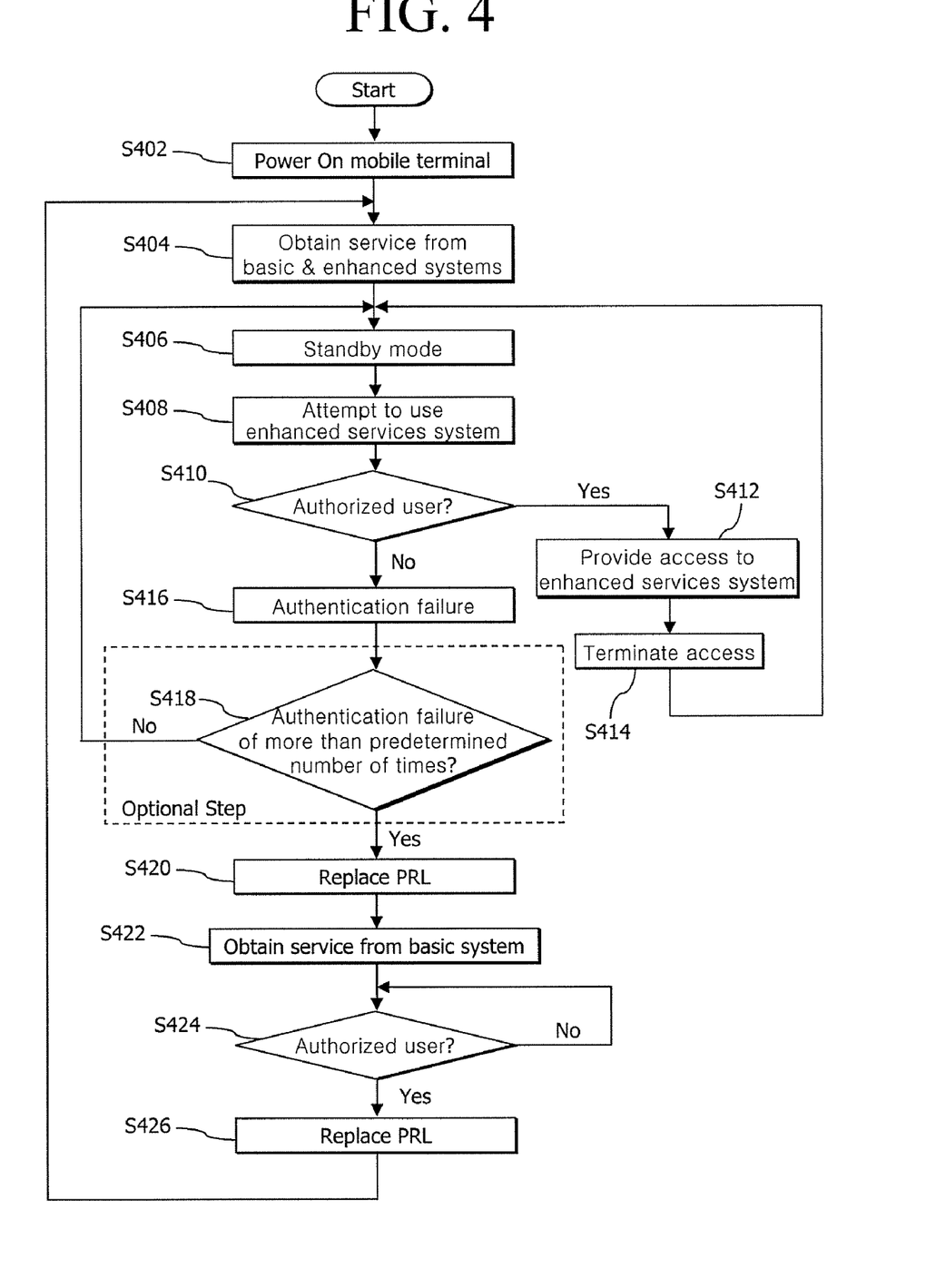
FIG. 4 is a flow chart of an exemplary method of restricting access to an enhanced services system according to an aspect of the present invention.

FIG. 4 is a flow chart of an exemplary method of restricting access to an enhanced services system according to an aspect of the present invention.

According to the method of FIG. 4, a mobile terminal is first powered on (S402). The mobile terminal then performs an initialization process to obtain service from a basic communication system and an enhanced services system, which are listed in the PRL of the mobile terminal (S404). The basic communication system may be a 1× system, for example, and the enhanced services system may be an EVDO system, for example. The mobile terminal then enters into a standby mode (S406). When the mobile terminal user attempts to use the enhanced services system (S408), the enhanced services system determines whether the user is an authorized user of the enhanced services system (S410), for example, by comparing a subscriber identifier associated with the mobile terminal with a list of authorized subscriber identifiers. If the user is authorized, the user is provided access to the enhanced services system (S412). After the user finishes using the enhanced services system (S414), the mobile terminal returns to the standby mode (S406).

However, if the enhanced services system determines that the mobile terminal is not an authorized user of the enhanced services system (S410), the system reports an authentication failure to the mobile terminal (S416). Either the enhanced services system or the mobile terminal keeps track of the number of times an authentication failure has occurred. The enhanced services system or the mobile terminal then determines whether an authentication failure has occurred more than a predetermined number of times, such as three (S418). If an authentication failure has not occurred more than the predetermined number of times, the mobile terminal returns to the standby mode (S406).

However, if an authentication failure has occurred more than the predetermined number of times, the enhanced services system replaces the PRL of the mobile terminal with a new PRL (S420), such as by downloading a new PRL to the mobile terminal via OTAPA, and deleting the old PRL of the mobile terminal. At this time, the enhanced services system also sends a text message and/or a voice message to the mobile terminal to notify the user to contact its service provider. As an alternative to the above, step S418 may be omitted, such that the enhanced services system replaces the PRL of the mobile terminal (S420) as soon as an authentication failure is first reported (S416). The new PRL includes the basic communication system in its list, but not the enhanced services system. The mobile terminal then goes through an initialization process again, in which it searches for and obtains service from the basic communication system, but not the enhanced services system (as it is no longer listed in the PRL) (S422).

The mobile terminal user may later become an authorized user of the enhanced services system, such as by obtaining a subscription or paying any delinquent bills. After the user has become an authorized user of the enhanced services system (S424), the enhanced services system then downloads a new PRL to the user's mobile terminal which includes the enhanced services system in its list (S426). The mobile terminal is then capable of obtaining service from the enhanced services system again.

Figure 5:
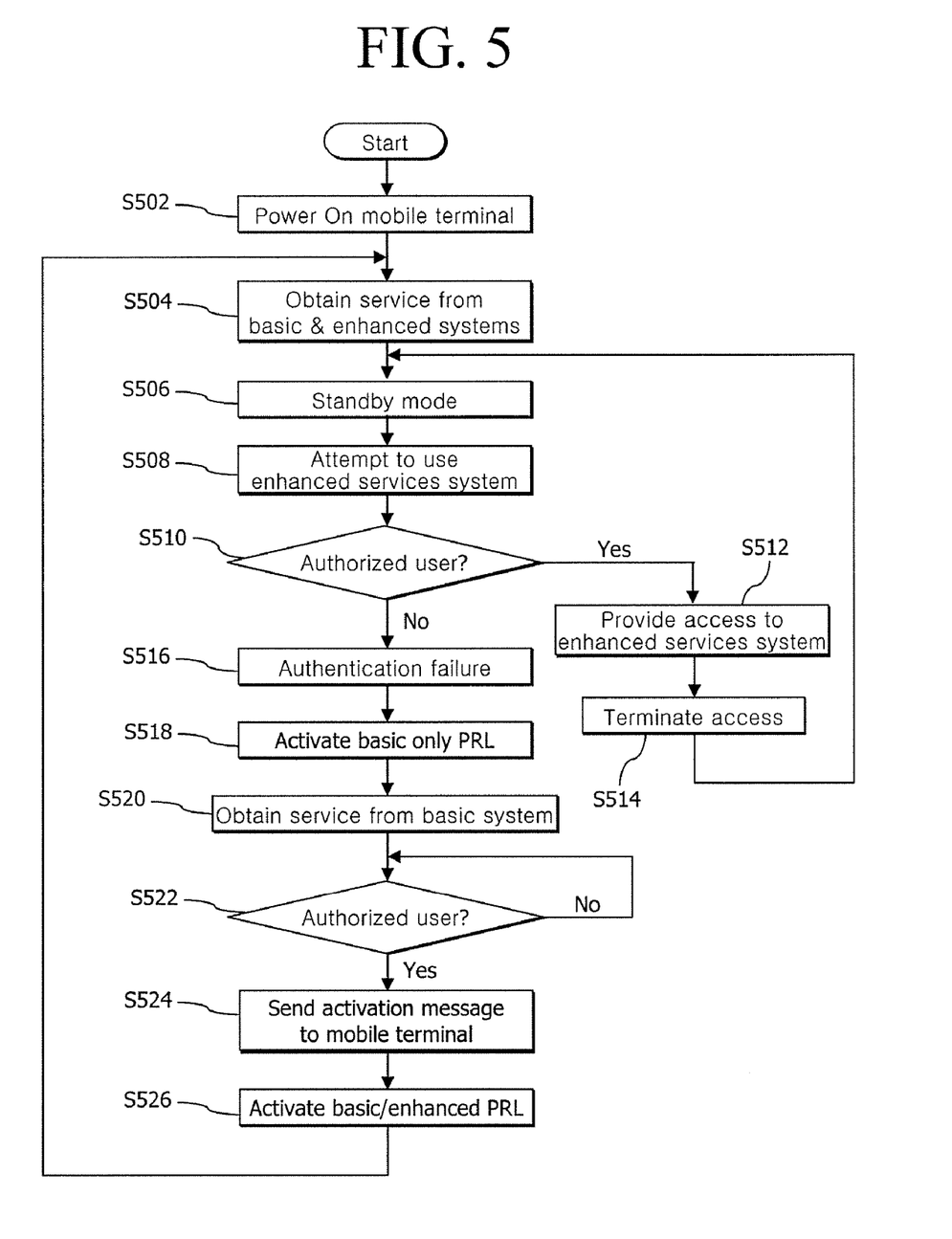
FIG. 5 is a flow chart of another embodiment of a method of restricting access to an enhanced services system according to an aspect of the present invention.

FIG. 5 is a flow chart of another embodiment of method of restricting access to an enhanced services system according to an aspect of the present invention.

According to the method of FIG. 5, a mobile terminal is first powered on (S502). The mobile terminal then performs an initialization process to obtain service from a basic communication system and an enhanced services system, which are listed in the PRL of the mobile terminal (S504). The basic communication system may be a 1× system, for example, and the enhanced services system may be an EVDO system, for example. The mobile terminal then enters into a standby mode (S506). When the mobile terminal user attempts to use the enhanced services system (S508), the enhanced services system determines whether the user is an authorized user of the enhanced services system (S510), for example, by comparing a subscriber identifier associated with the mobile terminal with a list of authorized subscriber identifiers. If the user is authorized, the user is provided access to the enhanced services system (S512). After the user finishes using the enhanced services system (S514), the mobile terminal returns to the standby mode (S506).

However, if the enhanced services system determines that the mobile terminal is not an authorized user of the enhanced services system (S510), the system reports an authentication failure to the mobile terminal (S516). The mobile terminal according to the method of FIG. 5 stores two PRLs: one which lists both a basic communication system and an enhanced services system, and one which lists only a basic communication system. Only one PRL is active at a time. When the mobile terminal receives the authentication failure report, it deactivates the PRL which lists the enhanced services system, and activates the PRL which lists only the basic communication system (S518). At this time, the enhanced services system also sends a text message and/or a voice message to the mobile terminal to notify the user to contact its service provider. The mobile terminal then goes through a re-initialization process (S520), in which it searches for and obtains service from the basic communication system, but not the enhanced services system.

The mobile terminal user may later become an authorized user of the enhanced services system, such as by obtaining a subscription or paying any delinquent bills. After the user has become an authorized user of the enhanced services system (S522), the enhanced services system then sends an activation message to the mobile terminal instructing it to activate the PRL which lists both the basic communication system and the enhanced services system (S524). The mobile terminal then activates this PRL (S526), enabling it to obtain service from the enhanced services system again.

The mobile terminal, system and methods described above decrease waste of wireless resources by preventing unauthorized users from communicating with an enhanced services system. Further, by cutting off service from an enhanced services system, a mobile terminal stops monitoring the enhanced services system, which conserves battery power.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

In accordance with various embodiments of the present disclosure, the methods described herein may be implemented by software programs executable by a processor. The present disclosure contemplates a computer-readable medium that includes instructions or receives and executes instructions responsive to a propagated signal. The term "computer-readable medium" shall include any medium that is capable of storing, encoding or carrying a set of instructions for execution by a processor to perform any one or more of the methods or operations disclosed herein.

In a particular non-limiting, exemplary embodiment, the computer-readable medium can include a solid-state memory such as, for example, a memory card or other package that houses one or more non-volatile read-only memories. Further, the computer-readable medium may be a random access memory or other volatile re-writable memory. Accordingly, the disclosure is considered to include any one or more of a computer-readable medium or a distribution medium and other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

Although the invention has been described with reference to an exemplary embodiment, it is understood that the words that have been used are words of description and illustration, rather than words of limitation. As the present invention may be embodied in several forms without departing from the spirit or essential characteristics thereof, it should also be understood that the above-described embodiment is not limited by any of the details of the foregoing description, unless otherwise specified. Rather, the above-described embodiment should be construed broadly within the spirit and scope of the present invention as defined in the appended claims. Therefore, changes may be made within the metes and bounds of the appended claims, as presently stated and as amended, without departing from the scope and spirit of the invention in its aspects.

What is claimed is:

1. A mobile terminal, comprising:
   a transceiver which transmits and receives wireless signals;
   a memory which stores a first preferred roaming list (PRL) listing a basic communication system and an existing and currently operating enhanced services system, and a second PRL listing the basic communication system but not the enhanced services system;
   an input unit configured to request access to the existing and currently operating enhanced services system;
   said transceiver further configured to receive an authentication failure report from the enhanced services system indicating a user of the mobile terminal is not authorized to use the existing and currently operating enhanced services system; and
   a controller which restricts an uplink access request of the mobile terminal to the enhanced services system by deactivating the first PRL and activating the second PRL in response to receiving the authentication failure report from the enhanced services system,
   wherein the controller restricts the uplink access of the mobile terminal to the enhanced services system as long as the first PRL is deactivated such that the mobile terminal does not transmit information requesting access to the existing and currently operating enhanced services system when the user of the mobile terminal again inputs the request to access the existing and currently operating enhanced services system, and
   wherein the first and second PRLs are both stored in the memory of the same mobile terminal.

2. The mobile terminal according to claim 1, wherein the enhanced services system is an Evolution-Data Optimized system.

3. The mobile terminal according to claim 1, wherein the user of the mobile terminal is not the authorized user of the enhanced services system if the user is not a subscriber to the enhanced services system, the user is a subscriber who has not paid his bills, or the user is a subscriber whose subscription period has expired.

4. The mobile terminal according to claim 1, wherein the controller enables access to the enhanced services system by activating the first PRL.

5. The mobile terminal according to claim 1, further comprising at least one of a display and a speaker which outputs a message notifying the user to contact his service provider when the second PRL is activated.

6. A system for restricting access to an enhanced services system, the system comprising:
an existing and currently operating enhanced services system which provides enhanced services to authorized users and prevents unauthorized users from communicating with the enhanced services system,
wherein the enhanced services system receives a request to access to the existing and currently operating enhanced services system from a mobile terminal, determines a user of the mobile terminal is not authorized to use the existing and currently operating enhanced services system, prevents the mobile terminal of the unauthorized user from performing an uplink communication with the enhanced services system by deleting a first preferred roaming list (PRL) stored in the mobile terminal of the unauthorized user which lists a basic communication system and the enhanced services system, and downloading to the mobile terminal a second PRL which lists the basic communication system but not the enhanced services system, and
wherein the enhanced services system prevents the mobile terminal of the unauthorized user from performing the uplink communication with the enhanced services system as long as the first PRL is deleted such that the mobile terminal does not transmit information requesting access to the existing and currently operating enhanced services system when the user of the mobile terminal again inputs the request to access the existing and currently operating enhanced services system, and
wherein the first and second PRLs are both stored in a memory of the same mobile terminal.

7. The system according to claim 6, wherein the enhanced services system determines the user is not the authorized user of the enhanced services system based on a subscriber identifier of the mobile terminal.

8. The system according to claim 6, wherein the enhanced services system allows the unauthorized user to communicate with the enhanced services system when the unauthorized user becomes an authorized user by deleting the second PRL and downloading the first PRL to the mobile terminal.

9. The system according to claim 6, wherein the basic communication system is a 1× system, and the enhanced services system is an Evolution-Data Optimized system.

10. A method for restricting access to an existing and currently operating enhanced services system, the method comprising:
requesting access to the existing and currently operating enhanced services system with a mobile terminal;
receiving an authentication failure report from the enhanced services system indicating a user of the mobile terminal is not an authorized user of the existing and currently operating enhanced services system;
receiving a first preferred roaming list (PRL) listing a basic communication service but not the enhanced services system from the existing and currently operating enhanced services system, and deleting a second PRL stored in the mobile terminal which lists the basic communication system and the enhanced services system if it is determined that the user of the mobile terminal is not the authorized user of the enhanced services system; and
restricting the mobile terminal from performing an uplink communication to the enhanced services system as long as the second PRL is replaced with the first PRL such that the mobile terminal does not transmit information requesting access to the existing and currently operating enhanced services system when the user of the mobile terminal again inputs the request to access the existing and currently operating enhanced services system, and
wherein the first and second PRLs are both stored in a memory of the same mobile terminal.

11. The method according to claim 10, wherein the receiving the authentication failure report indicating the user is not the authorized user of the enhanced services system is performed based on a subscriber identifier of the mobile terminal.

12. The method according to claim 10, further comprising:
deleting the first PRL and downloading the second PRL to the mobile terminal which lists the basic communication system and the enhanced services system when the user of the mobile terminal becomes an authorized user of the enhanced services system;
obtaining service from the enhanced services system; and
accessing the enhanced services system with the mobile terminal.

13. The method according to claim 10, wherein the basic communication system is a 1× system, and the enhanced services system is an Evolution-Data Optimized system.

14. A method for restricting access to an existing and currently operating enhanced services system, the method comprising:
requesting access to the existing and currently operating enhanced services system with a mobile terminal;
receiving an authentication failure report from the enhanced services system indicating a user of the mobile terminal is not an authorized user of the enhanced services system; and
preventing the mobile terminal from performing an uplink communication with the enhanced services system by activating a first preferred roaming list (PRL) stored in the mobile terminal which lists a basic communication system but does not list the enhanced services system, and deactivating a second PRL stored in the mobile terminal which lists the basic communication system and the enhanced services system, in response to the notification,
wherein the enhanced services system prevents the mobile terminal from communicating with the enhanced services system as long as the second PRL is deactivated such that the mobile terminal does not transmit information requesting access to the existing and currently operating enhanced services system when the user of the mobile terminal again inputs the request to access the existing and currently operating enhanced services system, and
wherein the first and second PRLs are both stored in a memory of the same mobile terminal.

15. The method according to claim 14, further comprising allowing the mobile terminal to access the enhanced services system by deactivating the first PRL and activating the second PRL stored in the mobile terminal which lists the basic communication system and the enhanced services system.

16. The method according to claim 14, wherein the basic communication system is a 1× system, and the enhanced services system is an Evolution-Data Optimized system.

* * * * *